United States Patent
Fan et al.

(10) Patent No.: US 9,160,229 B2
(45) Date of Patent: Oct. 13, 2015

(54) DC-DC CONVERTER

(71) Applicant: Texas Instruments Incorporated, Dallas, TX (US)

(72) Inventors: Jiwei Fan, Cary, NC (US); Tetsuo Tateishi, Aichi (JP); Siyuan Zhou, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 33 days.

(21) Appl. No.: 13/829,356

(22) Filed: Mar. 14, 2013

(65) Prior Publication Data
US 2014/0266084 A1 Sep. 18, 2014

(51) Int. Cl.
*G05F 1/00* (2006.01)
*H02M 3/156* (2006.01)

(52) U.S. Cl.
CPC ................................. *H02M 3/156* (2013.01)

(58) Field of Classification Search
CPC .... H02M 3/1588; H02M 3/157; H02M 3/156
USPC .................................. 323/271, 282, 283, 285
See application file for complete search history.

(56) References Cited

U.S. PATENT DOCUMENTS

| | | |
|---|---|---|
| 7,019,504 B2 | 3/2006 | Pullen et al. |
| 7,595,624 B2 | 9/2009 | Tateishi et al. |
| 7,652,461 B2 | 1/2010 | Tateishi |
| 2008/0024104 A1* | 1/2008 | Yamada ........................ 323/283 |
| 2009/0140708 A1 | 6/2009 | Tateishi et al. |
| 2011/0316502 A1* | 12/2011 | Tang et al. ..................... 323/271 |
| 2013/0057240 A1* | 3/2013 | Zambetti et al. .............. 323/271 |

OTHER PUBLICATIONS

Zhang, Nancy; Wu, Wenkai; Shu, Weidong; "D-CAP Mode With All-Ceramic Output Capacitor Application," TI Application Report SLVA453—Feb. 2011, 9 pages.
Fan, Jiwei; Li, Xuening; Lim, Sungkeun, Huang, Alex Q.; "Design and Characterization of Differentially Enhanced Duty Ripple Control (DE-DRC) for Step-Down Converter", IEEE Transaction on Power Electronics, vol. 24, No. 12, Dec. 2009, pp. 2714-2725.

* cited by examiner

*Primary Examiner* — Timothy J Dole
*Assistant Examiner* — Htet Kyaw
(74) *Attorney, Agent, or Firm* — William B. Kempler; Frank D. Cimino

(57) ABSTRACT

A DC-DC converter, having an output voltage and including at least one electronic switch; first circuitry controlling the output voltage by adjusting a switching frequency of the electronic switch, and second circuitry adjusting the switching frequency toward a target switching frequency when the switching frequency significantly deviates from the target switching frequency.

17 Claims, 6 Drawing Sheets

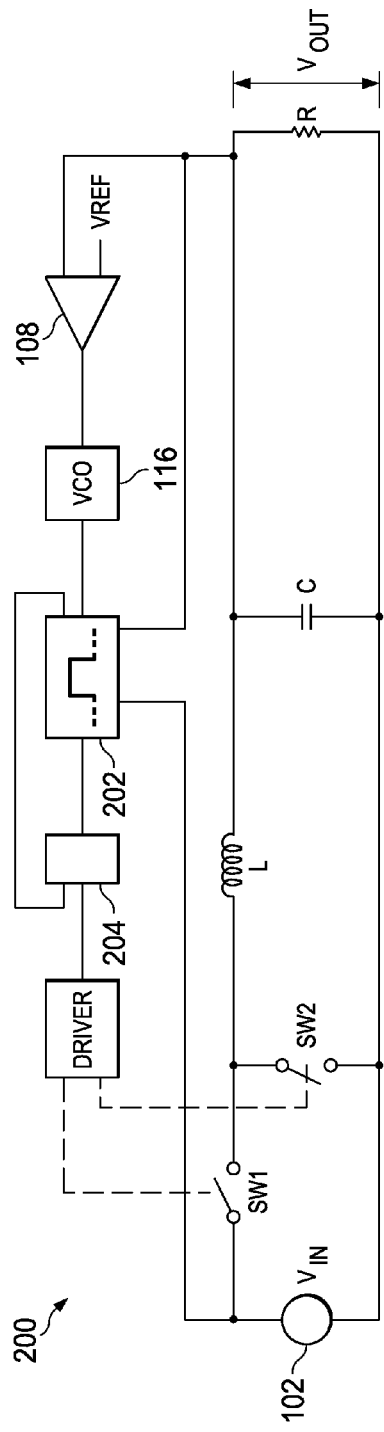
FIG. 2
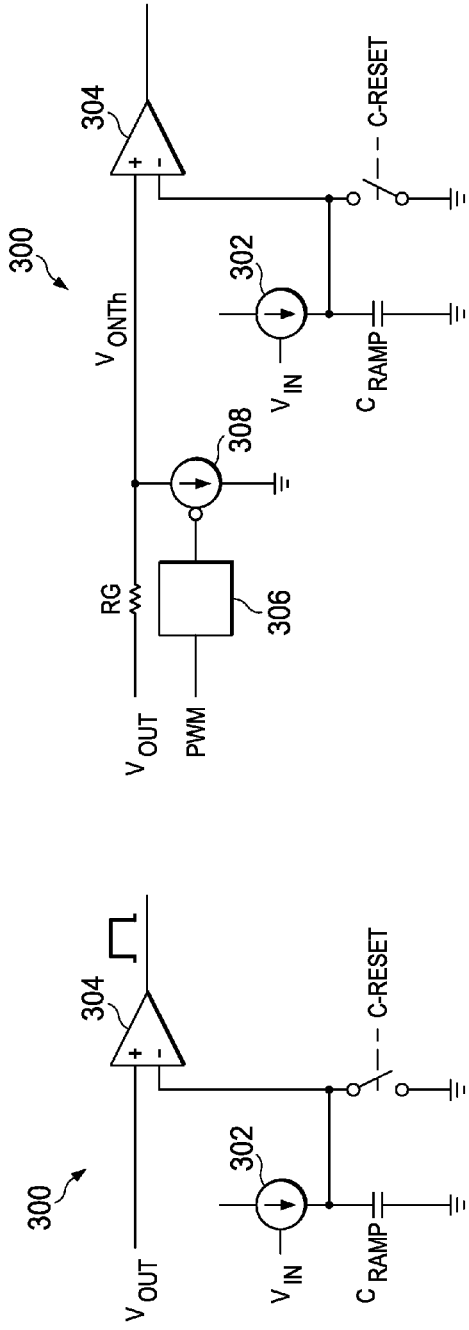
FIG. 3A
FIG. 3B

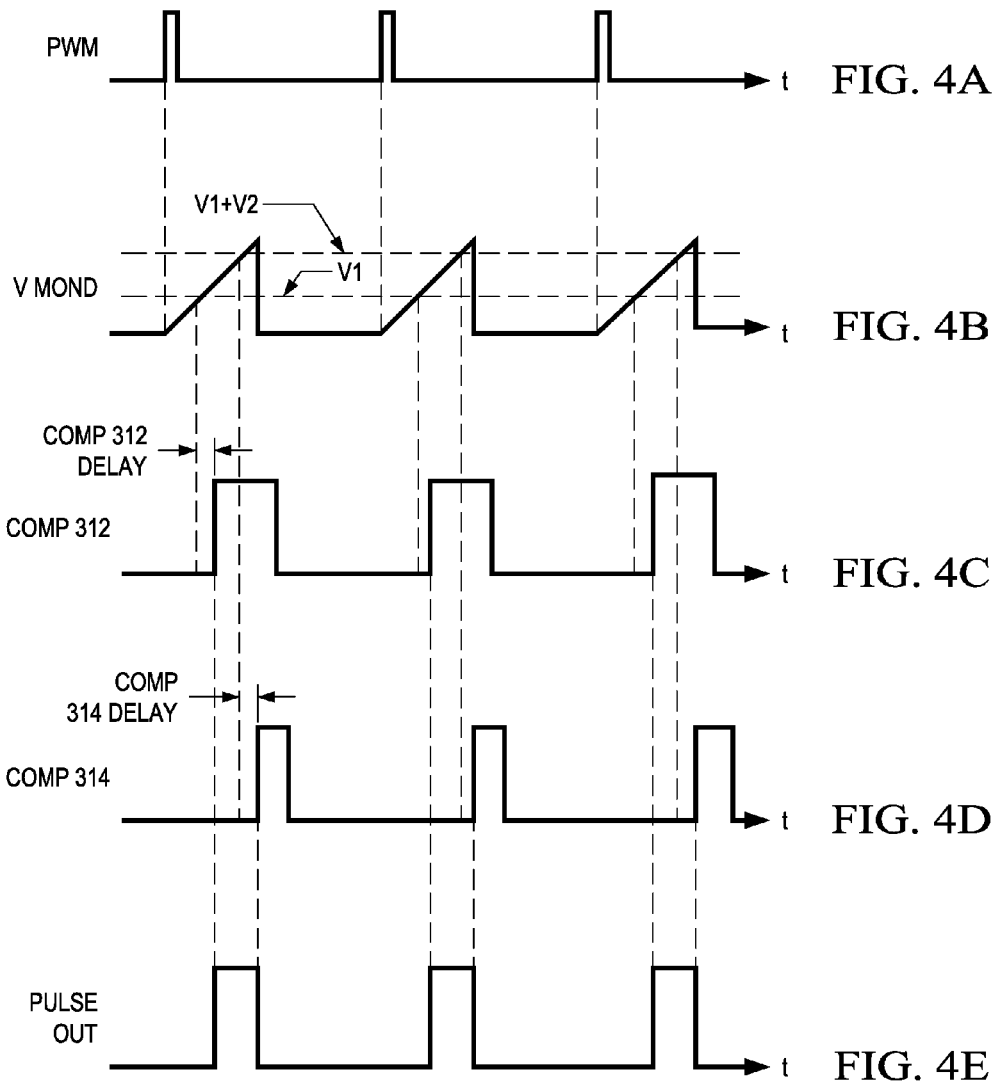

DC-DC CONVERTER

BACKGROUND

A DC-DC converter is an electronic circuit that converts a source of direct current (DC) from one voltage to another. For example DC-DC converters are widely used in portable devices to provide power from a battery. DC-DC converters may also regulate the output voltage, compensating for varying load current and variations in the input voltage.

FIG. 1A illustrates an example embodiment of one common type of DC-DC converter. The DC-DC converter circuit 100 in FIG. 1A (simplified to facilitate illustration and description) is a switching step-down converter (the Input voltage is higher than the output voltage), and the basic design is called a Buck converter. A power source 102 provides direct current at an input voltage $V_{IN}$. The circuit 100 provides direct current to a load (R) at an output voltage $V_{OUT}$. There are two electronic switches (SW1, SW2), only one of which is activated (closed) at any one time. SW2 may be a diode instead of a switch, and the diode is "activated" when positively biased. When SW1 is closed, current flows into R and a filter capacitor (C) from the source 102, and $V_{OUT}$ rises linearly. In addition, when SW1 is closed, energy is stored in L and C. When SW2 is closed, current flows from stored energy in C and from stored energy in L, and $V_{OUT}$ decreases linearly.

FIG. 1B illustrates an example embodiment 104 of a DC-DC boost converter circuit (the input voltage is lower than the output voltage). The primary difference between the circuit 100 of FIG. 1A and the circuit 104 of FIG. 1B is the location of the switches (SW1, SW2) relative to the inductor L. When SW1 in circuit 104 is closed, energy is stored in L and load current is provided by C. When SW2 in circuit 104 is closed, load current flows from $V_{IN}$ and from stored energy in L, and energy is stored in C. In Circuit 104 of FIG. 1B, SW2 may be a diode instead of a switch.

FIG. 1C illustrates an example embodiment 106 of the DC-DC converter circuit 100 of FIG. 1A with the addition of feedback to control the output voltage. An amplifier 108 amplifies the difference between $V_{OUT}$ and a reference voltage $V_{REF}$. A ramp generator 110 receives a clock signal (CLK) and generates a constant-frequency ramp signal. A comparator 112 compares the output of the amplifier 108 to the ramp signal. A driver circuit 114 activates at least SW1 (SW2 may optionally be a diode). The width of the pulse driving SW1 (called "on-time") is determined by the time at which the output of the amplifier 108 is equal to the rising ramp voltage. During the remainder of the clock cycle ("off-time") the driver 114 activates switch SW2 (or a diode conducts while forward biased).

There are many variations in topology and control of DC-DC converters. Some converters have multiple inductors in a resonant circuit. The circuit illustrated in FIG. 1C uses output voltage feedback. Some converters use current feedback, or other feedback signals such as a ripple voltage. Some converters have multiple feedback loops, in general, there are advantages and disadvantages of each variation, and some systems have special requirements, in particular, power supplies for advanced digital circuits have a challenging set of requirements. Microprocessor cores, digital signal processors, and other devices may switch rapidly from sleep-mode to full-power and full-power back to sleep-mode, requiring a fast response by the power supply to sudden changes in load current.

In general, there is a need to extend the high frequency response of a DC-DC converter while maintaining stability. This is especially true when significant loads may be switched in and out of standby mode to reduce power, in the embodiment of FIG. 1C, the amplifier 108 commonly includes a compensation filter (not illustrated), where "compensation" means that the feedback network gain and phase as a function of frequency ensure that the overall system with feedback is stable. However, for a system as depicted in FIG. 1G with constant-frequency switching, the system cannot respond to a sudden load change until the next clock cycle. An alternative way to handle rapidly changing current demands is to maintain a constant on-time (or off-time), and instantaneously change the switching period. Allowing the switching period to instantaneously change enables a faster response.

FIG. 1D illustrates an alternative embodiment having a constant on-time with variable off-time and variable switching frequency. In FIG. 1D, as in FIG. 1C, the difference between the output voltage $V_{OUT}$ and a reference voltage $V_{REF}$ is amplified by amplifier 108 to generate a voltage error feedback signal. In FIG. 1D, the voltage error signal drives a voltage controlled oscillator (VCO) 116. The output of the VCO 116 is a series of poises at the switching frequency. At the beginning of each cycle of the output of the VCO 118, a pulse generator ("one-shot") 118 generates a constant-width on-time pulse. The driver circuitry 120 drives SW1 during the on-time pulse, and then drives SW2 during the remaining portion of each cycle from the VCO 116.

The example circuit of FIG. 1D allows the switching period to instantaneously change, thereby enabling a faster response to a load change. A further advantage of the circuit of figure ID is that it does not need a compensation filter. However, the average switching frequency of the DC-DC converter in the circuit of FIG. 1D varies widely with load current and other power system parameters, and there are multiple system requirements that need a constant switching frequency, or at least a quasi-constant switching frequency. For example, L, C, and other components needed to filter the output voltage ripple need to be optimized for a particular ripple frequency (or a least a relatively narrow range of frequencies). In addition, suppression of system radio frequency interference (RFI) may require external system components that are optimized for a particular switching frequency (or at least a narrow range of frequencies). In addition, the efficiency of the DC-DC converter may be optimized at a particular switching frequency (or at least a narrow range of frequencies).

There is an ongoing need for a DC-DC converter with a rapid response to transient load conditions, and a narrow range of switching frequencies.

BRIEF DESCRIPTION OF THE DRAWINGS

FIG. 2 is a block diagram illustrating an example embodiment of an improved DC-DC converter.

FIG. 3A is a block diagram illustrating an example embodiment of additional detail for pad of the DC-DC converter of FIG. 2.

FIG. 3B is a block diagram illustrating an example embodiment of still more detail for pad of the DC-DC converter of FIG. 2.

FIGS. 4A-4E are timing diagrams illustrating example timing for the circuit of FIG. 3D.

DETAILED DESCRIPTION

Figure 1A:
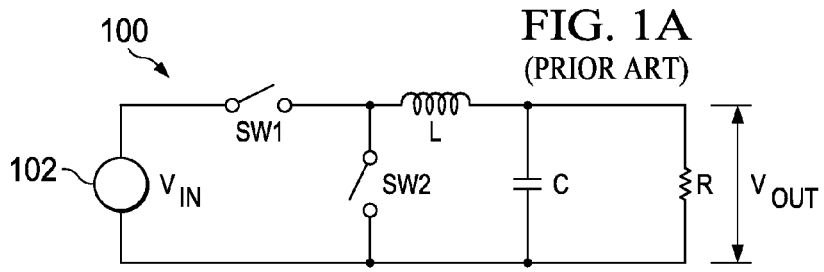
FIG. 1A is a block diagram illustrating an example prior art embodiment of a DC-DC converter.
Figure 1B:
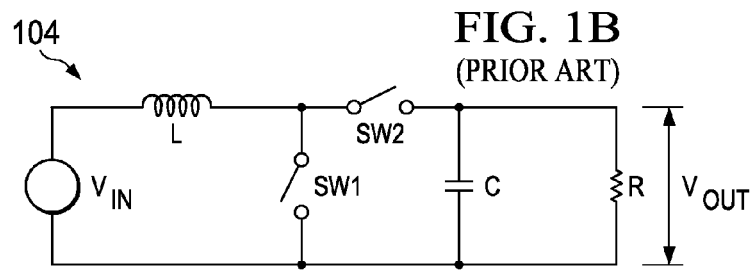
FIG. 1B is a block diagram illustrating an example alternative prior art embodiment of a DC-DC converter.
Figure 1C:
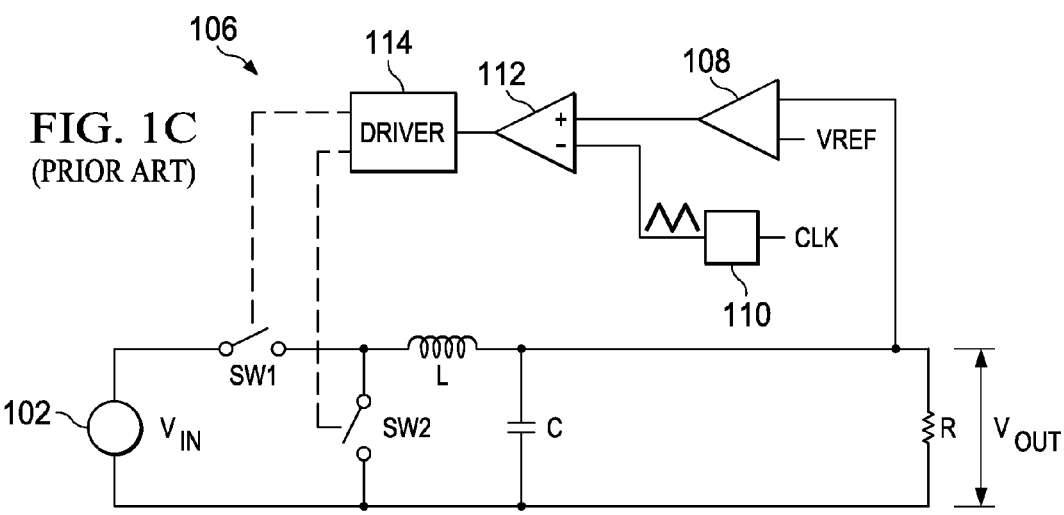
FIG. 1C is a block diagram illustrating an example of a feedback loop for the DC-DC converter of FIG. 1A.
Figure 1D:
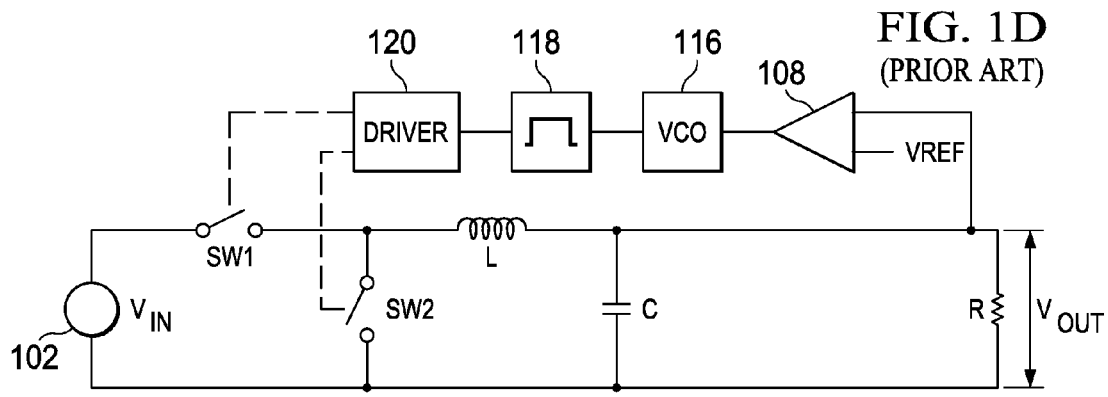
FIG. 1D is a block diagram illustrating an example of an alternative feedback loop for the DC-DC converter of FIG. 1A.

FIG. 2 illustrates an example embodiment of an improved DC-DC converter circuit 200. The example of FIG. 2 illustrates a variable switching frequency converter circuit as in FIG. 1D, but instead of a constant-width on-time pulse the example circuit 200 of FIG. 2 has an adaptive on-time pulse generator 202, and on-time pulse logic 204. The adaptive on-time pulse generator 202 slowly adjusts the on-time pulse width in response to the switching frequency to keep the average switching frequency within a relatively narrow range. The DC-DC converter circuit 200 of FIG. 2 effectively has two feedback paths. One feedback path controls the output voltage by instantaneously changing the switching period (and therefore, the instantaneous switching frequency). The second feedback path then slowly adjusts the switching frequency back toward a target switching frequency, in the example of FIG. 2, the second feedback path changes on-time as a function of switching frequency. As the on-time changes, the switching period and off-time also change until a new steady-state switching frequency is reached. The converter circuit 200 of FIG. 2 has an Instantaneous response to a current load change as in the circuit 104 of FIG. 1B, and the average switching frequency may change with load current, but the range of the average switching frequency of the circuit 200 of FIG. 2 is less than the range of the average switching frequency of the circuit 104 of FIG. 1B. In the circuit 200 of FIG. 2, when the switching frequency increases, the width of the on-time pulse is slowly increased, which increases the switching period, which reduces the switching frequency. When the switching frequency decreases, the width of the on-time poise is slowly decreased, which decreases the switching period, which increases the switching frequency. The result is a quasi-constant average switching frequency which is sufficient for many systems. For example, for a target switching frequency of 1.0 MHz, a specific implementation of a constant on-time converter as in circuit 104 FIG. 1D has a switching frequency of 775 KHz at no-load, and a switching frequency of 1.267 MHz at a load current of 30 A, whereas a specific implementation of an adaptive on-time converter as in circuit 200 of FIG. 2 has a switching frequency of 979 KHz at no-load, and a switching frequency of 1.007 MHz at a load current of 30 A.

Figure 3C:
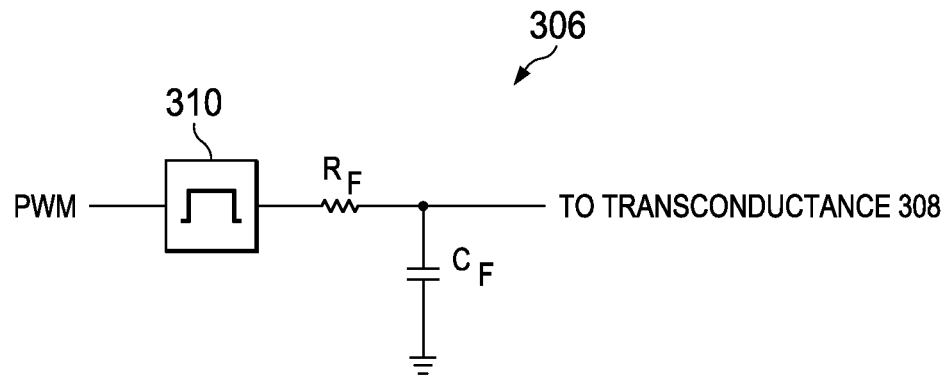
FIG. 3C is a block diagram illustrating an example embodiment of still more detail for part of the DC-DC converter of FIG. 2.
Figure 3D:
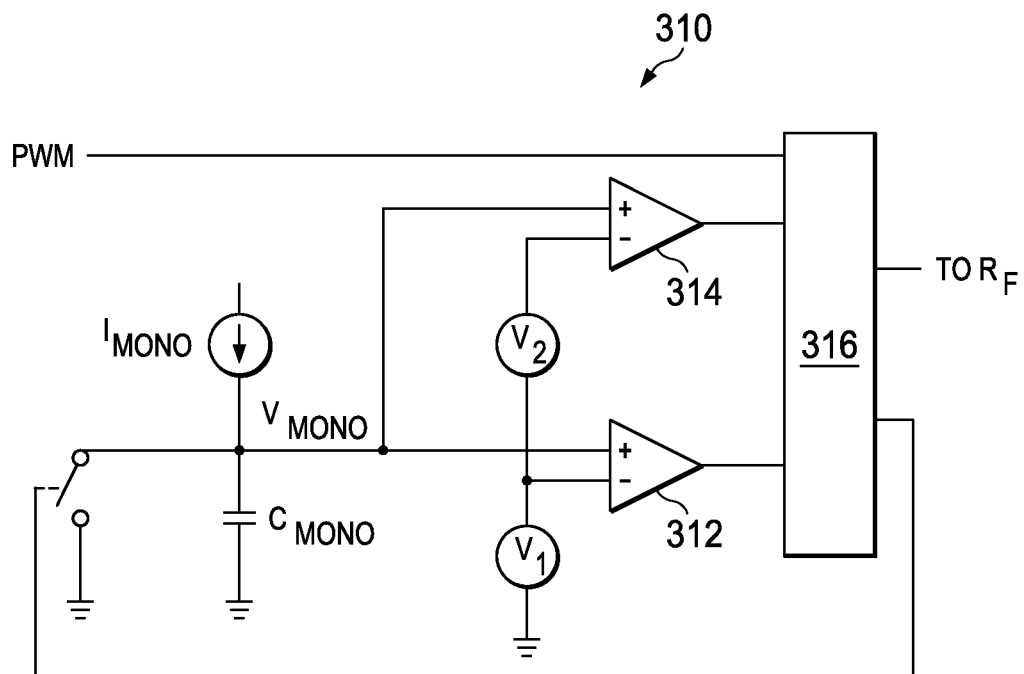
FIG. 3D is a block diagram illustrating an example embodiment of still more detail for part of the DC-DC converter of FIG. 2.

FIGS. 3A-3D illustrate an example embodiment 300 of the adaptable on-time pulse generator 202 in FIG. 2, with each successive figure providing additional detail. FIG. 3A illustrates an example circuit to generate constant-width on-time pulses. FIG. 3B illustrates an example embodiment of the circuit of FIG. 3A modified to change the on-time pulse width as a function of switching frequency, FIG. 3C illustrates an example embodiment of a frequency-to-current converter that is illustrated in block form in FIG. 38, FIG. 3D illustrates an example embodiment of a pulse generator that is illustrated in block form in FIG. 3C.

In the example of FIG. 3A a pulse generator 300 has a transconductance amplifier (voltage controlled current source) 302 providing a current determined by $V_{IN}$. The transconductance amplifier 302 linearly charges a capacitor $C_{RAMP}$. The ramp voltage on capacitor $C_{RAMP}$ is compared to $V_{OUT}$ by a comparator 304. When the ramp voltage is equal to $V_{OUT}$ the comparator 304 switches states. The signal C-RESET, generated by on-time pulse logic 204 (FIG. 2), opens a switch to permit the capacitor $C_{RAMP}$ to charge at the beginning of each switching cycle, and closes the switch to discharge capacitor $C_{RAMP}$ when the comparator 304 switches states. The on-time pulse starts at the beginning of each switching cycle, and ends when the comparator 304 switches states.

In the example of FIG. 3B, the circuit of FIG. 3A is modified so that instead of a ramp voltage being directly compared to $V_{OUT}$, a ramp voltage is compared to $V_{onTh}$ where $V_{onTh}$ is $V_{OUT}$ modified by the magnitude of the switching frequency. A frequency to voltage converter 306 receives a signal PMW (from on-time pulse logic 204, FIG. 2), which is a pulse generated at the beginning of each switching cycle, and the output of the frequency-to-voltage converter 306 drives a transconductance amplifier 308. As the switching frequency increases, the current from the transconductance amplifier 308 decreases. Note, in FIG. 3A, the transconductance amplifier 308 is illustrated as having an Inverting input, but an Inversion could be implemented elsewhere in the path. When the current from the transconductance amplifier decreases, a voltage drop across a resistor $R_G$ decreases, which causes the threshold voltage $V_{onTh}$ at the positive input of comparator 304 to increase, which causes the comparator 304 to change states later, which increases the on-time.

For the circuit of FIG. 3B, the transconductance amplifier 308 may generate a mid-point current at the target frequency and $V_{onTh}$ will then be lower than $V_{OUT}$ when the switching frequency is at the target frequency. The transconductance amplifies' 308 can then vary the on-time pulse width to increase or decrease the switching frequency around the target switching frequency.

FIG. 3C illustrates an example embodiment of the frequency-to-voltage converter 306 in FIG. 38. A pulse generator ("one-shot") 310 generates one pulse with a precision width and amplitude at the time of each pulse in the signal PWM. The output pulses from the pulse generator 310 are low-pass filtered by $R_F$ and $C_F$ to provide a slowly varying voltage to the transconductance amplifier 308 (figure SB).

FIG. 3D illustrates an example embodiment of the pulse generator 310 of FIG. 3C. The pulse generator 310 needs to generate precise pulses (width and amplitude) to ensure an accurate offset from $V_{OUT}$ at comparator 304 (FIG. 3B). The amplitude of the pulses from the pulse generator 310 may be, for example, $V_{REF}$. A current source $I_{MONO}$ drives a capacitor $C_{MONO}$ to generate a ramp voltage $V_{MONO}$. A first comparator 312 compares the ramp voltage $V_{MONO}$ to a first voltage reference V1. A second comparator 314 compares the ramp voltage $V_{MONO}$ to the sum of two voltage references (V1+V2). Each comparator (312, 314) has an inherent delay time between the time that its ramp input is equal to its reference input and when the comparator output changes states. Logic 316 generates a pulse that starts when the first comparator 312 changes states, and ends when the second comparator 314 changes states. As a result, the comparator switching delay times cancel each other.

Logic 316 also receives signal PMW and generates signal 318 to control a switch across $C_{MONO}$. Signal 318 opens the switch at the beginning of a PWM pulse and closes the switch at the end of the precision pulse being generated by logic 316.

FIGS. 4A-4E illustrate example timing for the various elements illustrated in FIG. 3D. FIG. 4A illustrates the PWM signal. FIG. 4B illustrates the ramp voltage $V_{MONO}$. Note that capacitor $C_{MONO}$ starts charging at the beginning of each cycle of PWM. FIG. 4C illustrates the output of comparator 312. Comparator 312 changes states after a short delay period after $V_{MONO}$ is equal to V1. FIG. 4D illustrates the output of comparator 314. Comparator 314 changes states after a short delay period after $V_{MONO}$ equal to V1+V2. FIG. 4E illustrates the output of logic 318. The output pulse starts when comparator 312 switches states, and ends when comparator 314 switches states, so the two delay periods cancel each other.

Figure 5:
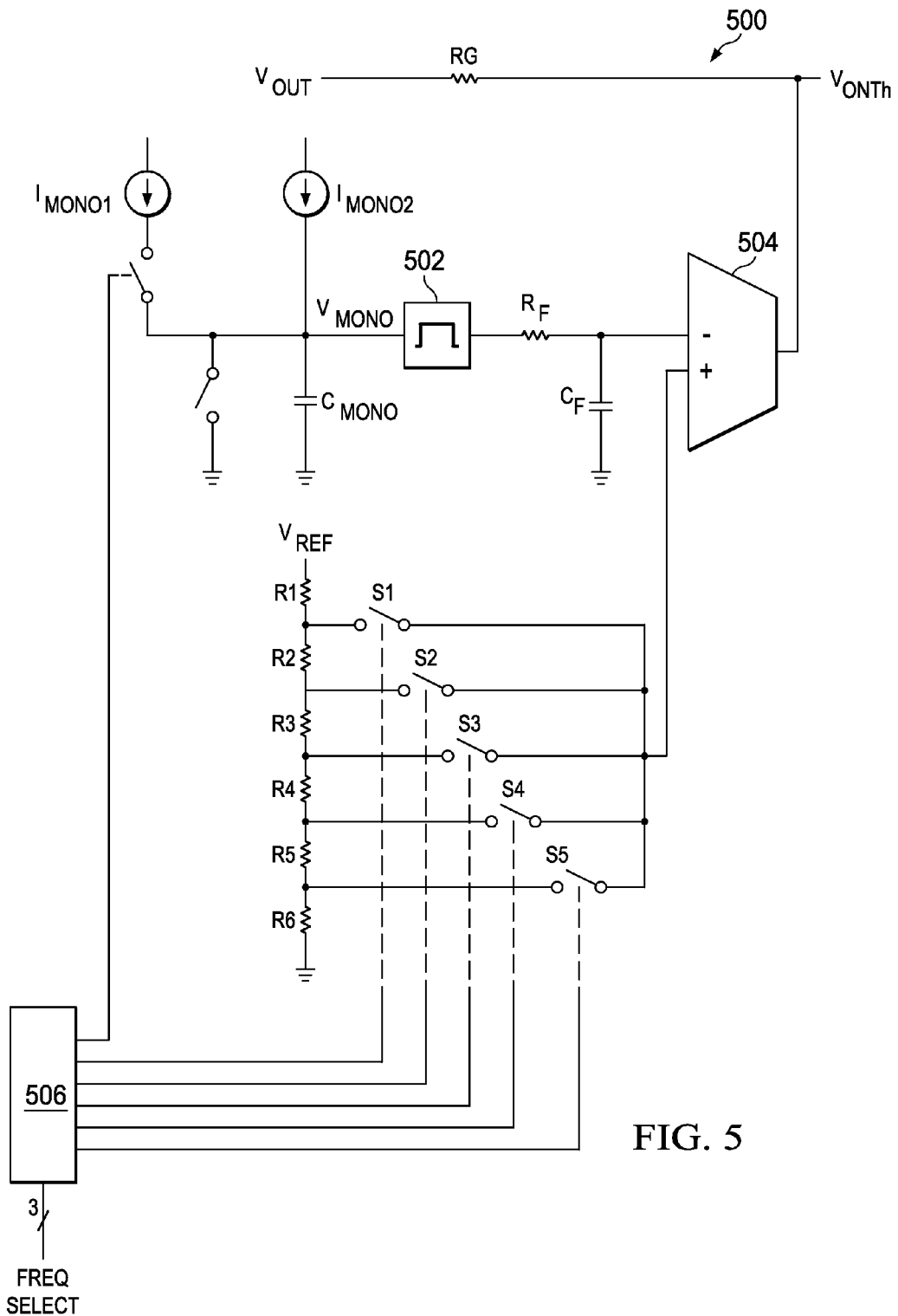
FIG. 5 is a block diagram illustrating an example embodiment of part of a DC-DC converter with digital selection of the target switching frequency.

The examples of FIGS. 3B and 3D illustrate circuits designed for one particular target switching frequency. When implemented as a commercial integrated circuit. It is desirable to be able to accommodate multiple target switching frequencies for multiple applications. FIG. 5 illustrates an example embodiment 300 of an adaptive on-time pulse generator based on circuits as in FIGS. 3B and 3D, but with a digital frequency selection input than can be used to adjust various parameters as needed for multiple different target switching frequencies. In FIG. 5, element 502 corresponds to the circuitry including comparators 312 and 314, reference voltages V1 and V2, and logic 316 in FIG. 3D. In FIG. 5, a transconductance amplifier 504 corresponds functionally to the transconductance amplifier 308 in FIG. 3B. In the example of FIG. 5, instead of one current source $I_{MONO}$ as in FIG. 3D, there are two current sources $I_{MONO1}$ and $I_{MONO2}$, which may be identical. In the example of FIG. 5, the transconductance amplifier 304 has a reference voltage derived from a resistor ladder (R1-R6) and a voltage source (for example, $V_{REF}$). Digital logic 506 receives a three-bit digital frequency select signal FREQ SELECT. Digital logic 506 then selects how many parallel current sources are used to determine the slope $V_{MONO}$, and which resistors (R2-R5) are connected in the resistor ladder to determine the reference voltage for the transconductance amplifier 504. In a specific example, the digital frequency select signal FREQ SELECT is used to select one of eight target switching frequencies, with the lowest target switching frequency at 300 KHz and progressing in 100 KHz steps to a highest target switching frequency of 1.0 MHz. For target switching frequencies of 300 KHz to 500 KHz the pulse width generated by element 502 of FIG. 5 is 500 nsec. For target switching frequencies above 500 KHz, the pulse width generated by element 502 is 250 nsec. The voltage reference resistor ratios are changed appropriately for each pulse width and each target switching frequency.

Figure 6:
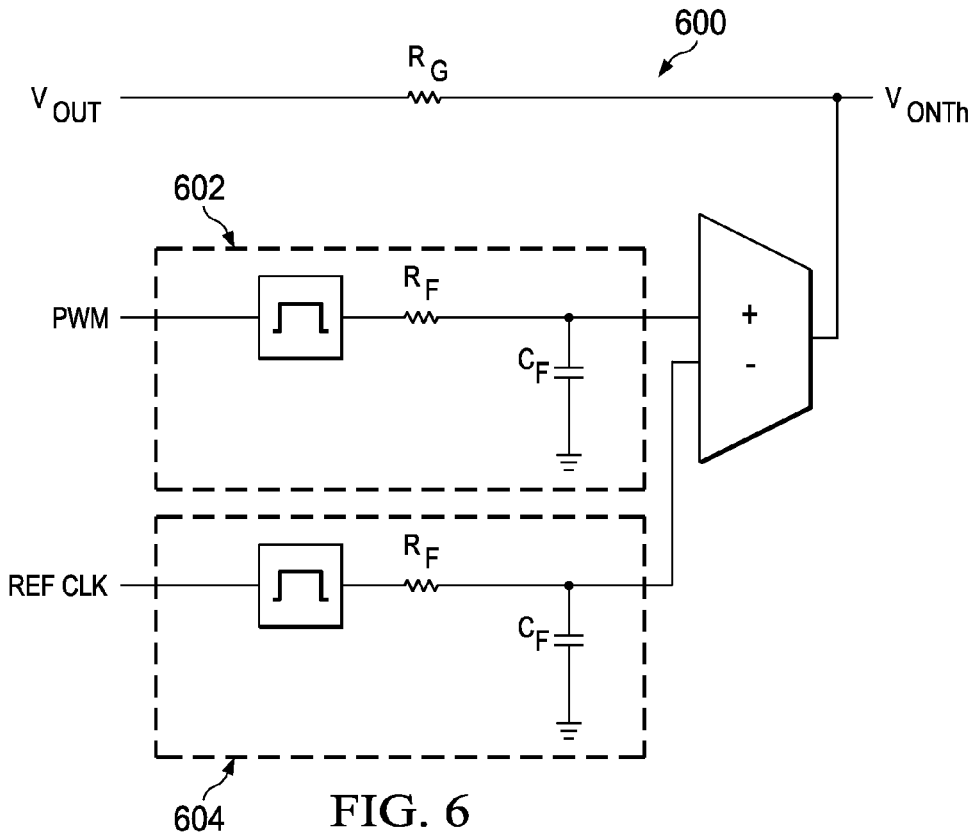
FIG. 6 is a block diagram illustrating an example embodiment of an alternative design for pad of an improved DC-DC converter.

In some applications an external reference clock may foe available. FIG. 6 illustrates an example adaptive on-time pulse generator 600 for a DC-DC converter where the average switching frequency is locked to an external reference clock. That is, a circuit as in FIG. 2, with an adaptive on-time pulse generator as in FIG. 6, will have a fast response to load changes like the circuit of FIG. 2, so that the switching frequency may temporarily change during a transient response to a load change, but the average switching frequency will be constant, in FIG. 6, elements 602 and 604 are identical elements, which may be, for example, identical to element 306 in FIG. 38, as implemented in FIGS. 3C and 3D. Element 602 receives the PWM signal. Element 604 receives a reference clock signal REF CLK. Over time, the on-time pulse adjustment feedback loop including element 602 will change the voltage output of element 602 until the voltage output of element 602 equals the voltage output of element 604, at which time the frequency of PWM will be equal to the frequency of REF CLK.

Note that the example of FIG. 2 is for a DC-DC converter having an Input voltage that is higher than the output voltage. However, the two feedback paths tone to instantaneously change the switching frequency to control output voltage, and one to adjust the switching frequency toward a target switching frequency) apply equally to a DC-DC converter having an Input voltage that is less than the output voltage (boost converter). Also, in the example of FIG. 2, adaptive control of on-time is used to adjust the average switching frequency. However, the two feedback paths (one to instantaneously change the switching frequency to control output voltage, and one to adjust the switching frequency toward a target switching frequency) apply equally to a DC-DC converter with an adaptive off-time pulse generator to adjust the average switching frequency.

Figure 7:
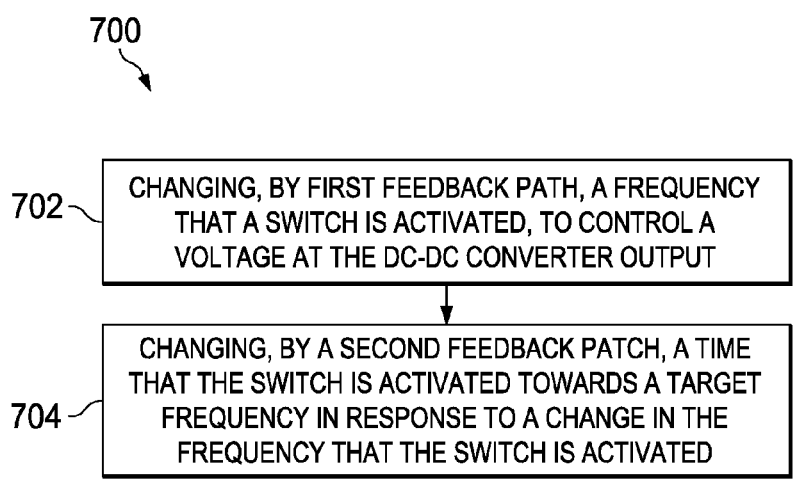
FIG. 7 is a flow chart illustrating an example embodiment of a method for controlling a DC-DC converter.

FIG. 7 illustrates an example method 700 for controlling a DC-DC converter. At step 702, a first feedback path changes a frequency that a switch is activated to control a voltage at the converter output. At step 704, a second feedback path changes a time period that the switch is activated to adjust the frequency that the switch is activated towards a target frequency, in response to a change in the frequency that the switch is activated.

While illustrative and presently preferred embodiments of the Invention have been described in detail herein, it is to be understood that the inventive concepts may be otherwise variously embodied and employed and that the appended claims are intended to be construed to include such variations except insofar as limited by the prior art.

What is claimed is:

1. A DC-DC converter having a converter input and a converter output, comprising:
   at least one electronic switch;
   first feedback circuitry controlling a voltage at the converter output by adjusting a switching frequency of the electronic switch; and
   second feedback circuitry further adjusting the switching frequency toward a target switching frequency utilizing a PWM signal used to control the electronic switch when the switching frequency significantly deviates from the target switching frequency by comparing the PWM signal to a reference, the second circuitry further comprising a pulse generator that determines the time period that the electronic switch is activated, where the time period is variable, the pulse generator further comprising a comparator having a ramp voltage as one input and a modified threshold voltage as a second input, where the modified threshold voltage changes with the switching frequency by a frequency to voltage converter driving a transconductance amplifier to increase the modified threshold voltage to thereby increase on-time of the electronic switch.

2. The DC-DC converter of claim 1, where a voltage at the converter input is greater than the voltage at the converter output.

3. The DC-DC converter of claim 1, where a voltage at the converter input is less than the voltage at the converter output.

4. The DC-DC converter of claim 1, where the second circuitry adjusts the switching frequency by adjusting a time period that the electronic switch is activated.

5. The DC-DC converter of claim 1, where the second circuitry adjusts the switching frequency by adjusting a time period that the electronic switch is off.

6. The DC-DC converter of claim 1, further comprising:
the second circuitry adjusting a time period that the electronic switch is activated to keep the average switching frequency near the target frequency.

7. The DC-DC converter of claim 6, further comprising:
the DC-DC converter receiving a digital control signal; and
the digital control signal determining the target frequency.

8. The DC-DC converter of claim 1, further comprising:
the DC-DC converter receiving a clock reference signal; and
the second circuitry adjusting the switching frequency to equal the frequency of the clock reference signal.

9. The DC-DC converter of claim 1, further comprising:
the first circuitry having a first response time to changes in the voltage at the converter output, and the second circuitry having a second response time to changes in the switching frequency, and the first response time being less than the second response time.

10. The DC-DC converter of claim 1, the second circuitry further comprising a pulse generator that determines the time period that the electronic switch is off, where the time period is variable.

11. A DC-DC converter having a converter input and a converter output, comprising:
at least one electronic switch;
an amplifier amplifying a difference between a voltage at the converter output and a reference voltage;
a voltage controlled oscillator receiving an output from the amplifier, the frequency of the voltage controlled oscillator determining a switching frequency for the switch;
a pulse generator generating one pulse during each oscillator cycle, where the pulse width determines a time period that the switch is activated, and where the pulse width is variable as a function of the switching frequency, further comprising receiving a reference signal for comparing with the switching frequency, the pulse generator further comprising a comparator having a ramp voltage as one input and a modified threshold voltage as a second input, where the threshold voltage changes with the switching frequency by a frequency to voltage converter driving a transconductance amplifier to increase the modified threshold voltage to thereby increase on-time of the electronic switch.

12. The DC-DC converter of claim 11, further comprising:
the pulse generator adjusting the time period that the electronic switch is activated to keep the average switching frequency near a target frequency.

13. The DC-DC converter of claim 12, further comprising:
the DC-DC converter wherein the reference signal is from a digital control signal; and
the digital control signal determining the target frequency.

14. The DC-DC converter of claim 12, further comprising:
the DC-DC converter wherein the reference signal is from a clock reference signal; and
the pulse generator adjusting the switching frequency to equal the frequency of the clock reference signal.

15. A method of controlling a DC-DC converter, the DC-DC converter comprising a converter input, a converter output, and a switch, the method comprising:
changing, by a first feedback path, a frequency that the switch is activated, to control a voltage at the converter output;
changing, by a second feedback path, a time period that the switch is activated, utilizing a PWM signal used to control the switch to adjust the frequency that the switch is activated towards a target frequency by comparing the PWM signal to a reference, in response to a change in the frequency that the switch is activated further comprising comparatoring a ramp voltage with a modified threshold voltage, where the threshold voltage changes with the switching frequency by a frequency to voltage converter driving a transconductance amplifier to increase the modified threshold voltage to thereby increase on-time of the electronic switch; and
changing the time period that the switch is activated to keep the average frequency, that the switch is activated, to equal the frequency of a clock reference signal.

16. The method of claim 15, the step of changing a time that the switch is activated further comprising:
changing the time period that the switch is activated to keep the average frequency, that the switch is activated, near the target frequency.

17. The method of claim 16, further comprising:
changing the target frequency in response to a digital control signal reference.

* * * * *